United States Patent
Tagore-Brage et al.

(10) Patent No.: US 9,014,195 B2
(45) Date of Patent: Apr. 21, 2015

(54) PACKET FORWARDING METHOD AND SYSTEM

(75) Inventors: Jens P. Tagore-Brage, Frederiksberg (DK); Kai Harrekilde-Petersen, Malmö (SE); Claus P. Jensen, Kbh. Ø. (DK); Jørgen Ravn Hansen, København Ø (DK)

(73) Assignee: Vitesse Semiconductor Corporation, Camarillo, CA (US)

( * ) Notice: Subject to any disclaimer, the term of this patent is extended or adjusted under 35 U.S.C. 154(b) by 1054 days.

(21) Appl. No.: 10/429,267

(22) Filed: May 2, 2003

(65) Prior Publication Data

US 2004/0218596 A1  Nov. 4, 2004

(51) Int. Cl.
*H04L 12/28* (2006.01)
*H04L 29/12* (2006.01)

(52) U.S. Cl.
CPC .... *H04L 29/12783* (2013.01); *H04L 29/12009* (2013.01); *H04L 29/12801* (2013.01); *H04L 61/35* (2013.01); *H04L 61/6004* (2013.01)

(58) Field of Classification Search
USPC ............... 370/349, 51, 55, 363, 89, 392, 93, 370/395.1, 0.31, 395.52, 395.54, 395.71, 370/470, 71, 74, 912, 13, 389, 395.31, 471, 370/474, 351, 355, 393, 913; 709/235, 38, 709/40, 230, 238, 240; 455/428, 525, 151.2
See application file for complete search history.

(56) References Cited

U.S. PATENT DOCUMENTS

| | | | | |
|---|---|---|---|---|
| 6,434,144 | B1 * | 8/2002 | Romanov | 370/392 |
| 6,560,229 | B1 * | 5/2003 | Kadambi et al. | 370/392 |
| 7,289,463 | B2 * | 10/2007 | Ozugur | 370/328 |
| 2001/0042130 | A1 * | 11/2001 | Brown | 709/238 |
| 2002/0172203 | A1 * | 11/2002 | Ji et al. | 370/392 |
| 2003/0174898 | A1 * | 9/2003 | Zheltov et al. | 382/246 |
| 2003/0204635 | A1 * | 10/2003 | Ko et al. | 709/250 |
| 2004/0196854 | A1 * | 10/2004 | Thubert et al. | 370/395.31 |

OTHER PUBLICATIONS

Aweya, James, "IP Router Architectures: An Overview", 1999, (48 pages).
Moestedt, Andreas, et al., "IP Address Lookup in Hardware for High-Speed Routing", published in IEEE Hot Interconnects VI, p. 31-39, Stanford, California, Aug. 1998, (9 pages).
Waldvogel, Marcel, et al., "Scalable High-Speed Prefix Matching", published in AMC Transactions on Computer Systems, vol. 19, No. 4, Nov. 2001 p. 440-482) (41 pages).

* cited by examiner

*Primary Examiner* — Andrew Lai
*Assistant Examiner* — Leon Andrews
(74) *Attorney, Agent, or Firm* — Klein, O'Neill & Singh, LLP

(57) ABSTRACT

Forwarding decisions for Internet Protocol packets/frames are provided. An IP address from received packets/frames is extracted and split into portions or parts, a prefix, offset and suffix. A prefix table is used to identify an entry with a longest match to the prefix. A base address is retrieved from the identified entry to generate an identifier used to locate another entry in another table. The other identified entry provides receiver data or information regarding the intended destination.

20 Claims, 3 Drawing Sheets

PACKET FORWARDING METHOD AND SYSTEM

BACKGROUND

The present invention generally relates to networks, and more particularly to forwarding Internet Protocol frames.

Computing networks provide for the sharing and transferring of information from one computing device to other computing devices. Various networking devices, such as routers, switches and the like, assist in the transfer of information between computing devices and/or computing networks. Transferring the information quickly and to the intended destination is often a concern. Additionally, with the increasing demand for vast amounts of information to be transferred under time and capacity restrictions make this transfer difficult. Network protocols, such as an Internet Protocol, have alleviated some of the concerns.

IP protocol specifies the format of the information or packets and the addressing of the information, i.e., an address labeling the packets. Networking devices interpret or identify the address to identify the intended destination and, if able, transfer the information to the destination. Otherwise, the network devices transfer the information to other networking devices that may be able to transfer the information to the destination.

The determination or identification of the intended destination from the address and the forwarding of the packets in such a way to assist the information to reach its intended destination is often time consuming. Algorithms and other techniques have been developed to increase the speed in which information is forwarded to the intended destination. However, some of these techniques are expensive monetarily, computationally and temporally.

SUMMARY OF THE INVENTION

The invention provides methods and systems performing forwarding decisions for Internet Protocol (IP) frames, such as IPv4 or IPv6 frames. The invention is suitable for routers, L3 switches, and other network equipment or devices utilizing IP addresses and more particularly in networks of a limited size and with directly connected hosts. The invention is also suitable for very high frame rates.

In one aspect of the invention, a method of determining receiver data from information conforming to an Internet Protocol is provided. An IP address is extracted from the information, two disjunctive portions, a first portion (portion A) and a second portion (portion B), are identified from the extracted IP address. The method also comprises identifying a prefix entry in a first table, the prefix entry having a longest match with first portion, extracting from the identified prefix entry a base address, generating an entry identifier by performing a predetermined mathematical operation on a numerical interpretation of first portion and the extracted base address, identifying an entry in a second table that corresponds to the generated entry identifier, and extracting receiver data from the identified entry in the second table.

In another aspect of the invention, an apparatus operating in a workgroup network and configured to determine receiver data from information conforming to an Internet Protocol (IP) is provided. The apparatus comprises a network interface configured to receive information from a network outside the workgroup network, memory configured to store a first and second tables, and a forwarding engine configured to extract an IP address from the information, identify a prefix entry in the first table that corresponds to a portion of the IP address, extract a base address from the identified prefix entry, generating an entry identifier using another portion of the IP address and the extracted base address, identify an entry in the second table that corresponds to the generated entry identifier, and extract receiver data from the identified entry in the second table.

Many of the attendant features of this invention will be more readily appreciated as the same becomes better understood by reference to the following detailed description considered in connection with the accompanying drawings.

DETAILED DESCRIPTION

Figure 1:
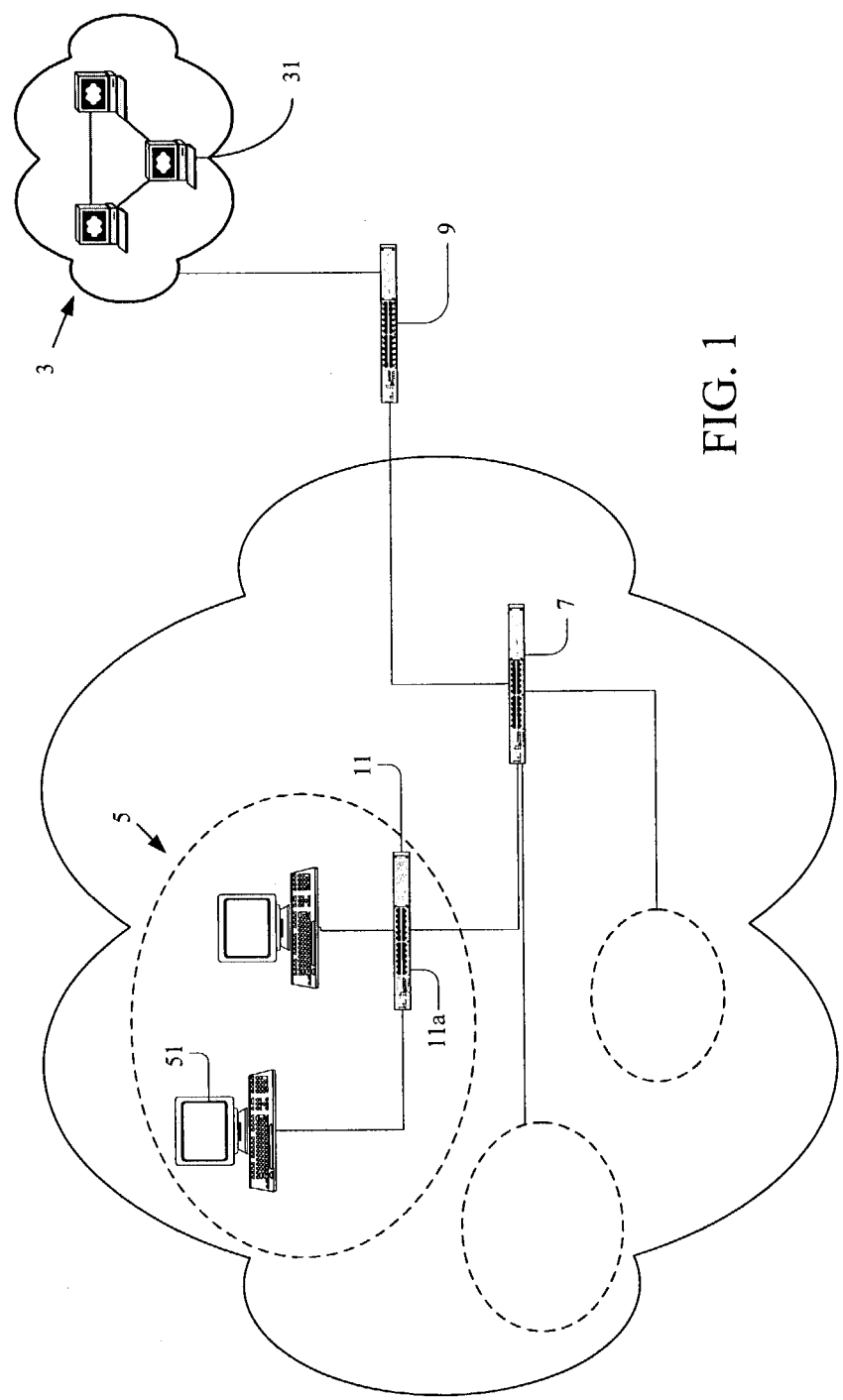
FIG. 1 illustrates an exemplary networking environment utilizing the invention.

In FIG. 1, a computing device, such as, computer 31 in network 3 sends information, e.g., Internet Protocol (IP) packets. The destination or intended recipient for the IP packets is computer 51 in network 5. In order for the IP packets to be received by the computer 51, the IP packets find their way through various networks with the assistance of networking devices. For example, networking devices, such as routers, switches and the like, configured to analyze or identify an Internet Protocol (IP) packet, are shown as router 7, 9 and 11. The networking devices determine whether the IP packets should be forwarded to a computing device, i.e., the IP packets have reached its intended destination, or to another networking device that may be able to forward the IP packets to its intended destination.

Router 7 may be considered a core router. Router 7 provides considerable processing power and thus increased processing speed but is often expensive. Core routers are able to recognize or analyze IP packets to perform IP packet forwarding decisions by searching through extensive numbers of IP addresses. Router 9 may be considered an edge router. Router 9 is slow, but flexible and handles network-to-network interfaces. Router 9 can be software based and thus can be quite affordable. Router 11 may be considered as workgroup router that is fast, low-cost and has relatively small address tables.

Each router provides an algorithm or technique for determining the IP packet forwarding decisions. For example, the routers 7 and 9 provide Classless Inter-Domain Routing (CIDR) support to determine where to forward or route the IP packets. Router 11 includes a network interface (not shown) configured to receive IP packets or frames and a forwarding engine 11a that is able to operate at full wire-speed with the flexibility of CIDR searches.

The forwarding engine may be software based, hardware based or a combination of both. In one embodiment, the forwarding engine is provided in monolithic IP router chips for very high link speeds (for multiple 10 GbE links), with wire-speed performance. As a result CIDR-based routing in low-cost (e.g. workgroup) switch/routers is provided. A system or networking environment based on such a switch/router chip inherits the same properties. Also, the forwarding engine applies to chips and systems for routers and other IP address aware applications and is also well suited for the address space (limited in size) typically experienced in workgroup switch/routers. The forwarding engine may also be adapted to a number of specific situations and uses/positions in a network.

The forwarding engine operates quickly, typically requiring only one clock cycle per routing operation. The forwarding engine is also inexpensive since the "expensive" prefix table is augmented with a low-cost ARP table routing implementation. Furthermore, the forwarding engine supports CIDR lookups, which is otherwise a compute intensive feature (and therefore expensive or slow). In one embodiment, the cost of implementing the forwarding engine is comparable to the cost of L2 switching.

For illustrative purposes, the number of computing devices, networking devices and networks is limited, as it should be recognized that the number of computing devices, networking devices and networks may be exceedingly numerous. It should also be recognized that the networking devices positioning and connectivity relative to the various networks and computing devices shown may vary.

Figure 2:
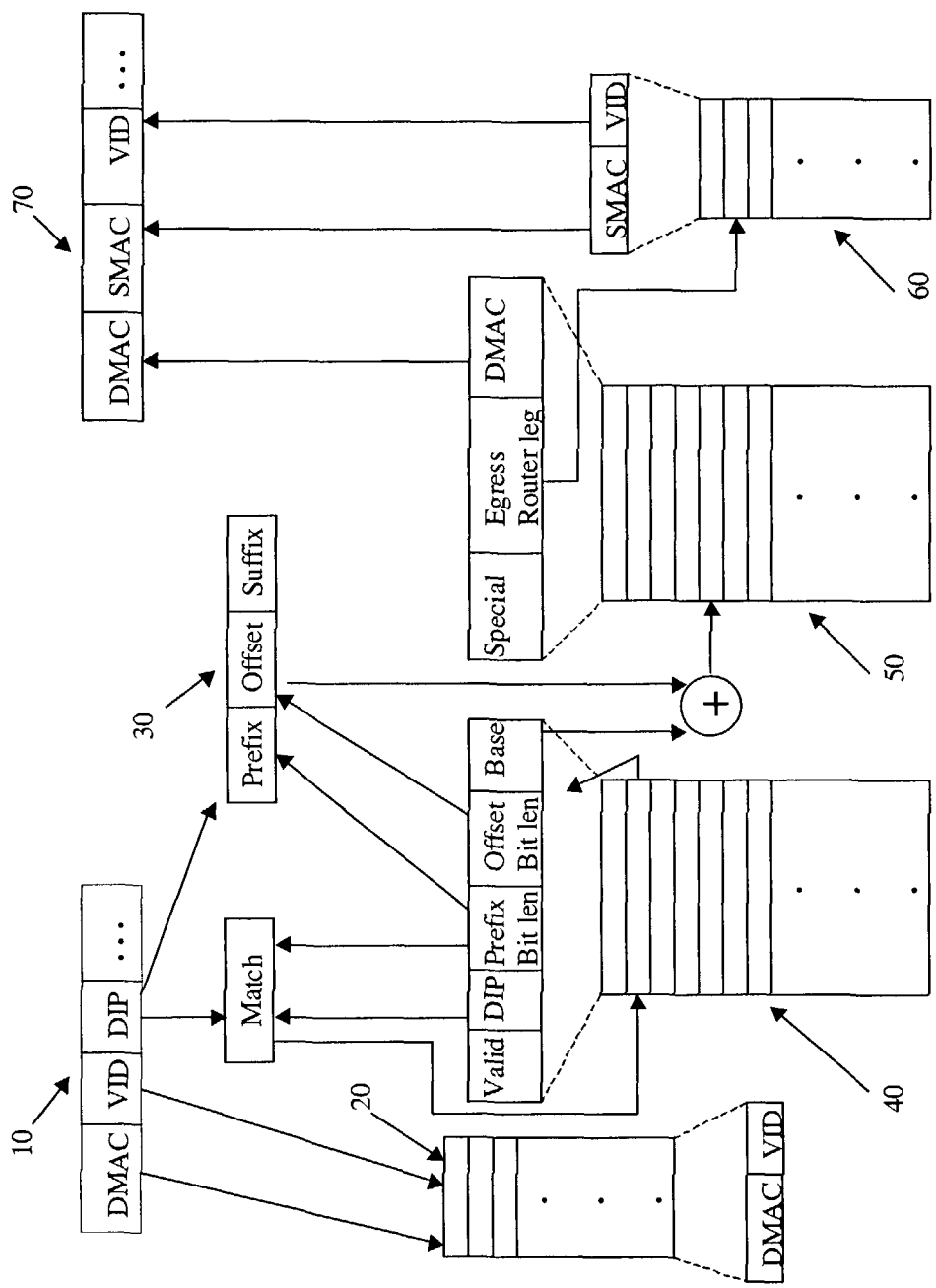
FIG. 2 illustrates an operational block diagram of forwarding packets.

In FIG. 2, an ingress IP packet 10 is illustrated. This packet comprises a number of fields, some of them are shown in FIG. 2. The resulting egress IP packet 70 is also illustrated. The fields illustrated are the fields edited by the forwarding engine. The ingress and egress IP packets 10 conform to standard IPv4 packets/frames.

First, a classifier (not shown) identifies IPv4 frames and checks that the headers are valid and suitable for routing and/or forwarding. A frame sent to a router leg is identified by the forwarding engine. The forwarding engine matches the destination MAC address (DMAC) and VLAN identifier (VID) pair against an ingress router table 20, a fourth table, of ingress router legs. The forwarding engine extracts the Destination IP address (DIP) 30 from the frame. In one embodiment, the source IP address (SIP) or other equally structured addressing information or the like may be used or extracted. In general, the DIP comprises three disjunctive parts, a prefix, an offset, and a suffix. Any of these parts may be of zero size.

The DIP is matched against a small table or prefix table 40 (a first table) by the forwarding engine. The small table 40 comprises a number of entries. Each entry has a DIP, the number of bits of that DIP which are in the prefix, the number of bits of that DIP which are in the offset, and a base address. In one embodiment, the DIP prefix 30 is matched between the prefixes (defined by the DIP and the number of bits in the prefix) in the small table 40. In one embodiment, the entries of the small table 40 are prioritized. As such, the table is searched from one end (the high priority end) and the longest match DIP is selected. The longer the prefix, the more bits in the prefix, and thus the higher the priority assigned or associated with the entry. As such, starting from the longest entry or highest priority entry, ensures that the longest prefix match will be chosen first.

In one embodiment, the forwarding engine identifies a match by XORing the DIP of the entry in the small table 40 and the DIP 30 and then ANDing the result with a bitmap having the first "prefix" number of bits set to "1" and the rest to 0. It should be noted that different entries may have different numbers of prefix bits.

Once a matching entry is found, an offset is derived from the matching entry that also contains the number of bits in the offset. The offset or number of bits from the DIP immediately following the found prefix is extracted. A base address is also extracted from the matched entry. The value of the offset bits are interpreted as an integer and added to the base address to yield a final address for an ARP table 50, a second table. The ARP table 50 contains a new Destination MAC address as well as a pointer to the egress router leg. The egress router leg table 60, the third table, provides a new Source MAC address (SMAC) and a new VLAN identifier (VID).

The forwarding engine edits or updates the IP packet/frame using the new DMAC, SMAC and VID to form the resulting egress frame 70 by replacing the DMAC, SMAC, and VID. The forwarding engine also decrements a Time-To-Live entry and updates the IP header checksum and the frame checksum.

The above described search procedure performed by the forwarding engine could also be used in other IPv4 applications that calls for address matching, not just for routing. As such, the output of the forwarding engine or router/switch may instead be identified, e.g., an output port ID of a switch/router. The forwarding engine can also be utilized for untagged frames. Generally, the VIDs involved represents any use of VLAN identifiers, and for non-VLAN aware routers, the VIDs are simply not used. In one embodiment, the ingress and egress router leg tables 20 and 60 are merged into a common router leg table.

In one embodiment, each entry in the prefix table 40 has a Valid flag, which simply allows unused entries to be disabled. In the ARP table, a Special flag indicates special DIP addresses, frames for these addresses could be sent to a host processor for exception handling. Also, the prefix table has a final default entry (0.0.0.0/0), ensuring that a match is always found. This entry can either be a hard-coded part of the forwarding engine process described above, or an actual entry programmed into the table. In one embodiment, the prefix lookup is performed using parallel matching of all prefixes. If the entries in the prefix table are organized according to prefix length, the best match can then be found with a simple priority encoder.

Since the prefix table is preferably comparatively short, prefix matching can be done in a few clock cycles, and the rest of the process is straightforward table lookups. Consequently, very high address analysis rates can be achieved at a low cost.

The size of the prefix and offset (portion A and portion B) may be varied for different situations. The matching procedure performed by the forwarding engine is very well suited for a number of typical network scenarios. For example, for final (downstream) host routing (i.e., the router is directly attached to the IP subnet to which the host with the given DIP belongs), an entry in the prefix table may be set up with a prefix matching the subnet, and an offset length equal to all the remaining bits in the address. Consequently, each entry in the ARP table (in the address range Base up to $Base+2^{Offset\_Bits}-1$) represents one host address in the subnet; for non-existing hosts and special addresses (e.g., the subnet broadcast address), the Special flag is set.

In another example, for "default" upstream network routes, a prefix may be set to match the network, and the number of offset bits is set to 0. This entry then points to a single entry in the ARP table, which contains the address of the next-hop router. For collections of closely related upstream networks, a prefix entry may be created that matches the common part of the network addresses. The offset bit length is preferably set to the remaining bits in the network addresses (so the number of prefix bits plus the number of offset bits is less then the total number of address bits). Each related entry in the ARP table then represents the next-hop router towards one of the networks in the collection. The above modes or scenarios may be combined in the same router/data structure/search method performed by the forwarding engine.

As such, the search/matching procedure performed by the forwarding engine yields a very compact representation of typical network address spaces. As an extension to the forwarding engine, per-prefix (or even per-ARP) table entry aging can be introduced. As such, this allows a host software to select which entries to handle in hardware and which in software, in the case of a table overflow.

A security feature, in one embodiment, is also incorporated as a matrix having a row corresponding to each entry in the table 20 and a column corresponding to each entry in the table 60. Thus, a bit in each intersection of the matrix may describe whether data may be transmitted from the corresponding ingress router leg to the corresponding egress router leg. Thus, illegal transmission of data may be avoided.

In one embodiment, the forwarding engine provides multicast handling. Normally, hashing is performed in order to obtain an entry of a multicast packet in a table. In this embodiment, part of the ARP table 50 is reserved for lookup for multicast packets. However, in this situation, the base addresses in the prefix table 40 is altered so that the entry addresses (offset plus base address) for singlecast packets do not coincide with reserved entries. Thus, if, at a point in time, more multicast entries are desired, more entries will be reserved.

However, due to the fact that a hashing is used for determining the multicast entries, a new hashing algorithm may be used and therefore a recalculation of all multicast entries is performed. Opposed to that, the base addresses of the singlecast entries in the table are changed in order to ensure that no singlecast entries lie in the entries reserved for multicast entries. Altering the base addresses facilitates or ensures that the same calculation (addition) with the same offsets may be maintained.

Figure 3:
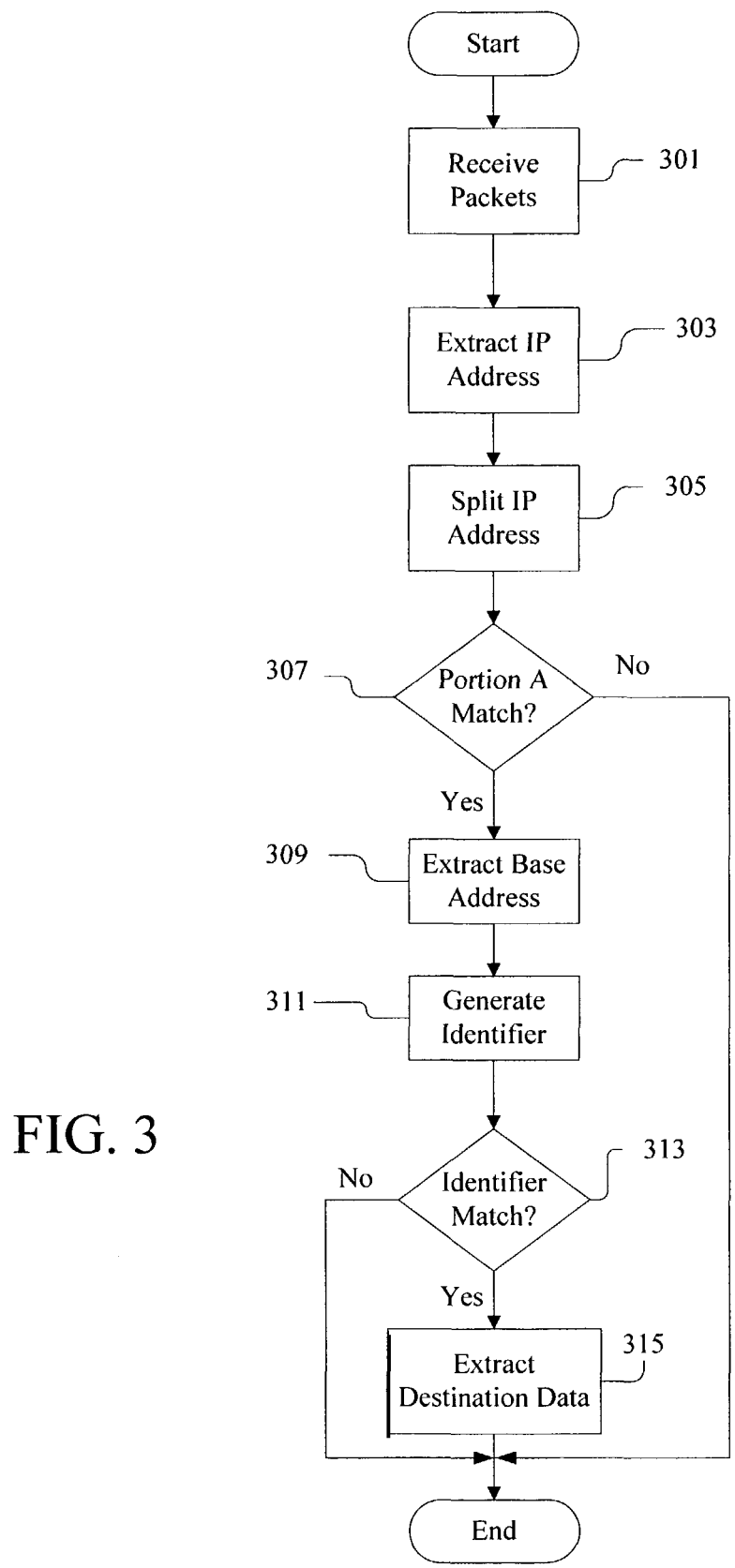
FIG. 3 illustrates a flow diagram of one embodiment of forwarding packets.

In FIG. 3, a process for determining receiver data for a data packet or frame is illustrated. In block 301, the process receives data packets or frames. In one embodiment, the packets or frames conform to an Internet Protocol having or including an IP address (such as a SIP or a DIP). In block 303, the process extracts the IP address, e.g., the DIP, from the received data. Utilizing different parts of the IP address, e.g., the DIP or SIP, reduces the expenditure of storage for the tables described below. The process splits or identifies two portions, portion A and portion B, in the IP address. In one embodiment, the two portions are disjunctive, i.e., have no parts in common. However, portion A and/or B may have zero length, i.e., no information. In this instance, different contents or parts of the packet or frame are used instead of the IP address. In one embodiment, portion A is identified as a number of bits positioned at a beginning of the IP address and/or portion B is identified as a number of bits positioned immediately after the bit(s) identified for portion A.

The process, in block 307, access a first table having a plurality of entries to determine if a entry in the first table matches or corresponds to portion A. If a match is not found, the process ends or returns. If a match is found, the process continues to block 309. In one embodiment, a match is found by identifying the entry in the first table that has the longest match, e.g., the entry that has the most number of identifiers in the same order as the portion A of the IP address.

In another embodiment, information relating to a size of the searching data, e.g., portion A of the IP address, and information relating to a second size, the size of an entry in the first table, are identified or determined. When the information relating to the size of the searching data corresponds to the information relating to the size of an entry in the first table, a match is found. The corresponding entry in the first table for the second size is utilized in block 309.

In a further embodiment, the previously described embodiments are combined. In other words, identifying the information relating to the size of the searching data that corresponds to the information relating to the size of an entry in the first table, narrows the number of entries in the first table to a subset of entries. Utilizing the subset of entries, a match is found by identifying the entries in the subset of entries that has the longest match.

In another embodiment, information relating to a size of the searching data, e.g., portion A of the IP address, is identified from a table having a plurality of entries of searching data. Alternatively, only portions of the first table are examined, extracted or generated as a separate table to determine a match. These portions or separate table include entries that correspond to or are larger than in size than the size of the searching data, e.g., portion A or the beginning portions of portion A.

In block 309, the process extracts a base address from the identified entry in the first table in block 307. In block 311, the process generates an entry identifier by performing a predetermined mathematical operation on a numerical interpretation of portion B and the base address. In one embodiment, a numerical representation is obtained using a mathematical operation, algorithm, or formula on the contents of portion B, the base address, and/or the combination of the two. In another embodiment, the binary number of portion B is interpreted as an integer and added to the base address.

The process, in block 313, accesses a second table having a plurality of entries to determine if an entry in the second table matches or corresponds to the generated entry identifier. If a match is not found, the process ends or returns. If a match is found, the process continues to block 315 to extract receiver data or identifying information of the intended destination from the identified entry in the second table. In one embodiment, the receiver data extracted comprises a Destination MAC address or a destination port from the identified entry in the second table. A destination port may be a physical or virtual output port of a switch or router with or coupled to the forwarding engine. In a further embodiment, Destination MAC address or destination port is inserted into the packet or frame. In another embodiment, a Source MAC address (SMAC) and/or a VLAN Identification (VID) from or using the identified entry in the second table is inserted into the packet or frame. The SMAC and/or VID may also be in a third table, e.g., an egress router leg table, and identified by an identifier derived from the identified entry in the second table. This table may be denoted an egress router leg table.

Additional information from the received packet or frame may also be identified or matched. For example, using a fourth table, such as a ingress router leg table, an entry having a corresponding Destination MAC address (DMAC) and/or a VLAN Identifier (VID) from the packet or frame can be identified.

Using the egress and ingress router leg tables, the forwarding engine can prevent or allow, i.e., provide a security function, forwarding of the packets or frames. For example, a matrix may utilized that denotes for each point therein whether data may be transmitted from the corresponding entry in the ingress router leg table (fourth table) to the corresponding egress router leg table (third table). If the packet or frame is permitted or not permitted to be transmitted, the packet or frame may be dropped, outputted to another destination or the intended destination, further analyzed, such as deriving statistics on the basis of groups of data or forwarding individual data packets or frames to, e.g., a CPU, performing statistical analysis on all packets or frames, and/or alerting an operator.

In one embodiment, the data packets or frames received are single-cast or multicast packets/frames. If multicast packets/frames are received a number of entries in the second table for a predetermined use are reserved. Entries in the first table are identified where a result of the predetermined mathematical operation is performed on the base address of the entry and a possible numerical representation of a corresponding portion B lies within the reserved entries. The base address in the identified entries is altered, so that a result of the predetermined mathematical operation performed on the altered base address of the entry and a possible numerical representation of a corresponding portion B does not lie within the reserved entries of the second table.

In this respect, a possible numeric representation may be any numeric representation which may be derived according to the manner actually used and from any possible portion B. Normally, the numeric representation would lie within a well-defined integer interval, whereby a base address computation will not bring the resulting entry into conflict with the reserved entries.

Thus, a number of entries in the second table are reserved for multicast packets/frames. When it is desired to alter the number of entries reserved for multicast traffic, the number of entries for the other traffic is also affected. Thus, those base addresses in the corresponding entries in the first table which, when combined, using the predetermined mathematical operation, with the corresponding portion B's (such as the adding) result in an entry now reserved are changed. The operation for combining the two numbers or the manner in which the mathematical representation is derived from portion B may be changed instead but this may cause all non-reserved entries to be changed.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive. The scope of the invention to be determined by the appended claims, their equivalents and claims supported by the specification rather than the foregoing description.

The invention claimed is:

1. A method of determining receiver data by a networking device, the method comprising:
    receiving information conforming to an Internet Protocol (IP) on an ingress router leg of the networking device;
    extracting an IP address from the information;
    identifying, by the networking device, an entry in a first table having a plurality of entries each comprising a destination IP address including a prefix and an offset, a first value corresponding to a number of bits of the destination IP address that are in the prefix indicating the length of the prefix, a second value corresponding to a number of bits in the offset indicating the length of the offset, and a base address, the entries being organized according to the length of the prefix and the identified entry having the longest prefix matching at least a portion of the extracted IP address;
    generating, by the networking device, an entry identifier by performing a predetermined mathematical operation on the base address of the identified entry and a portion of the IP address defined by the prefix length and the offset length of the identified entry;
    locating, by the networking device, an entry in a second table at the generated entry identifier;
    extracting, by the networking device, receiver data from the located entry in the second table; and
    supplying the information conforming to the Internet Protocol to an egress router leg of the networking device based on the receiver data.

2. The method of claim 1 wherein each prefix is stored in a location having a same number of bits and the first value indicating the length of the prefix indicates the number of bits in the prefix used in the identifying the entry in the first table.

3. The method of claim 1 wherein the identifying the entry in the first table comprises comparing a number of bits in the IP address indicated by the prefix length to the prefix.

4. The method of claim 3 wherein the comparing utilizes bits positioned at a beginning of the IP address.

5. The method of claim 4 wherein the generating the entry identifier utilizes the second value indicating the length of the offset of the identified entry positioned immediately after the first value indicating the length of the prefix of the identified entry.

6. The method of claim 1 wherein the predetermined mathematical operation is addition.

7. The method of claim 1 further comprising extracting data describing one of a Destination Media Access Control address (DMAC) and a destination port from the located entry in the second table.

8. The method of claim 1 further comprising identifying at least one of a Source Media Access Control address (SMAC) and a Virtual Local Area Network Identification (VID).

9. The method of claim 8 further comprising identifying the at least one of the SMAC and the VID in an entry in a third table by using an identifier in the located entry in the second table.

10. The method of claim 9 further comprising editing the information to include at least one of a Destination Media Access Control address (DMAC), the SMAC, and the VID.

11. The method of claim 10 further comprising:
    deriving additional information from the information; and
    identifying in a fourth table an entry having data fields that correspond to the additional information.

12. The method of claim 11 wherein the additional information comprises at least one of the DMAC and the VID.

13. The method of claim 12 further comprising determining handling of the information from the identified entries in the third and fourth tables.

14. The method of claim 13 wherein the determined handling of the information comprises at least one of deleting the information, outputting the information, analyzing the information, performing statistical analysis on the information and related information, and alerting an operator.

15. The method of claim 1 further comprising:
    reserving a number of entries in the second table for a predetermined use,
    identifying entries in the first table where a result of the predetermined mathematical operation performed on the base address of the entry and a corresponding portion of the IP address lies within the reserved entries, and
    altering the base addresses in the identified entries so that a result of the predetermined mathematical operation performed on the altered base address of the entry and a possible corresponding portion of the IP address falls outside the reserved entries of the second table.

16. The method of claim 15 wherein the predetermined use is multicasting.

17. The method of claim 1 wherein each entry in the first table further comprises a valid field and where the identifying the entry in the first table only identifies entries having a valid field value indicating a valid entry.

18. The method of claim 1 wherein the plurality of entries in the first table are arranged according to prefix length.

19. The method of claim 1 wherein the first table includes a default entry having a first value indicating a length of zero and that matches all values of the extracted IP address.

20. The method of claim 1 wherein the portion of the IP address defined by the prefix length and the offset length of the identified entry is a number bits indicated by the offset of the identified entry that are disjunctive from the bits of the extracted IP address matched to the prefix of the identified entry.

* * * * *